United States Patent [19]

Shorter, Jr.

[11] 4,070,980
[45] * Jan. 31, 1978

[54] CHANNEL CONNECTOR FOR FLOATING DOCKS

[76] Inventor: Myron L. Shorter, Jr., 81 Calypso Shores, Ignacio, Calif. 94947

[*] Notice: The portion of the term of this patent subsequent to July 6, 1993, has been disclaimed.

[21] Appl. No.: 697,832

[22] Filed: June 21, 1976

[51] Int. Cl.² .......................................... B63B 35/44
[52] U.S. Cl. .................................................. 114/263
[58] Field of Search ................. 114/.5 R, .5 F, .5 T, 114/77 R, 266, 267, 263; 9/2 S, 2 R; 52/578, 493, 579

[56] References Cited

U.S. PATENT DOCUMENTS

| | | | |
|---|---|---|---|
| 3,091,203 | 5/1963 | Usab | 114/.5 F |
| 3,128,737 | 4/1964 | Usab | 114/.5 F |
| 3,289,621 | 12/1966 | Sebring | 114/.5 F |
| 3,448,709 | 6/1969 | Hardwick, Jr. | 114/.5 F |
| 3,497,213 | 2/1970 | Stanwood | 52/578 |
| 3,580,202 | 5/1971 | Thompson | 114/.5 F |
| 3,620,027 | 11/1971 | Nordell | 114/266 |
| 3,967,569 | 7/1976 | Shorter, Jr. | 114/266 |

Primary Examiner—Trygve M. Blix
Assistant Examiner—Jesus D. Sotelo
Attorney, Agent, or Firm—Bielen and Peterson

[57] ABSTRACT

A connecting apparatus for floating docks providing a rigid interconnection of modular units which allows a convenient assembly and alteration for accomodation of boats of different size, the connecting apparatus comprises a U-shaped channel which brackets a cooperating flange structure on each of two adjacent float units, the U-channel being oriented with a flat top plate interfacing a top surface of the flange structure; a vertical side plate arranged against a side surface of the flange structure, and a flat bottom plate interfacing a bottom surface of the flange structure; wherein the channel has integrally spaced holes in the top and bottom plates for coincident arrangement with select holes in the flange structure; and cooperating elements for attaching wooden walers thereto for protection of boats moored thereto.

10 Claims, 5 Drawing Figures

U.S. Patent
Jan. 31, 1978
4,070,980
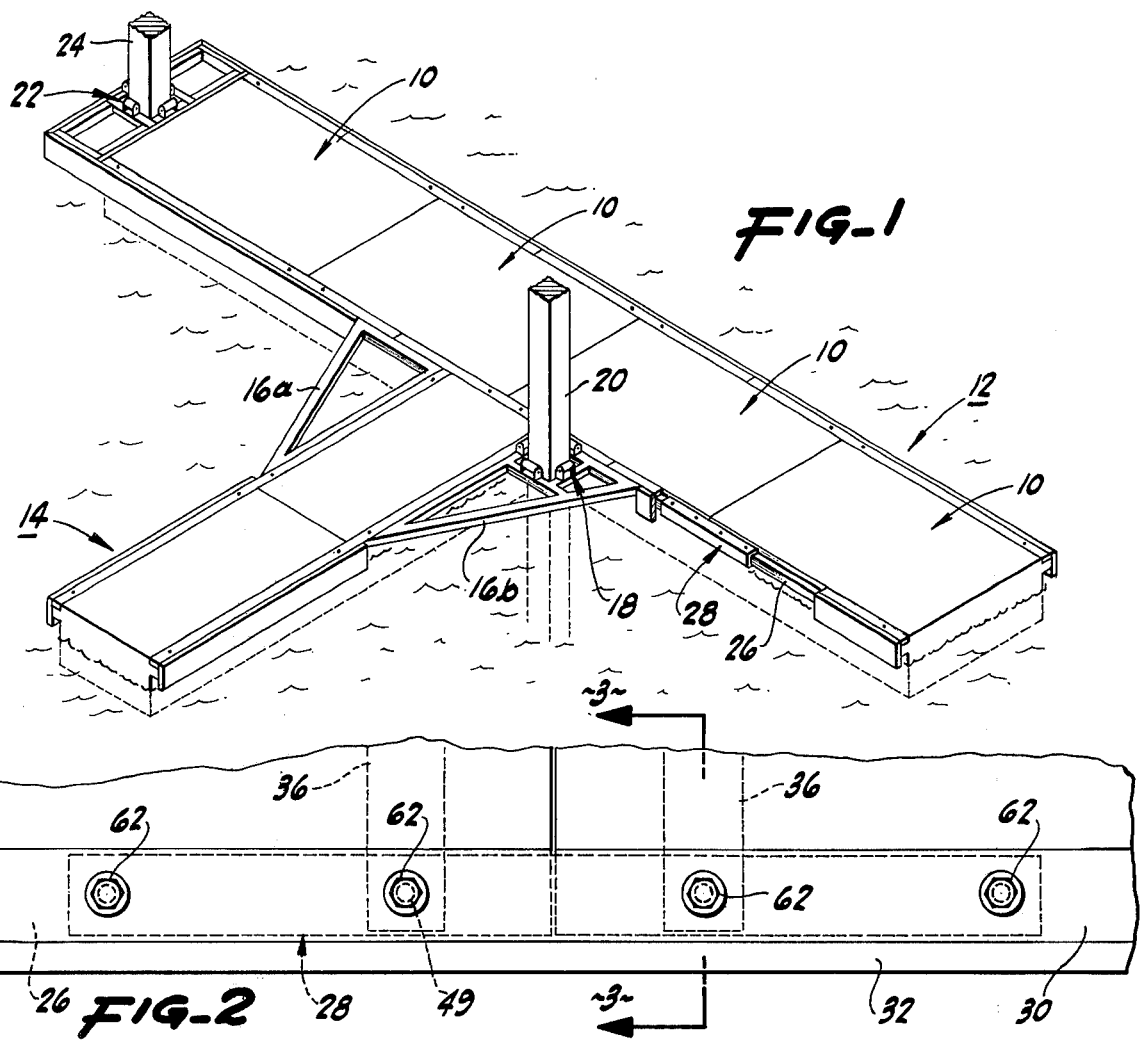
FIG-1
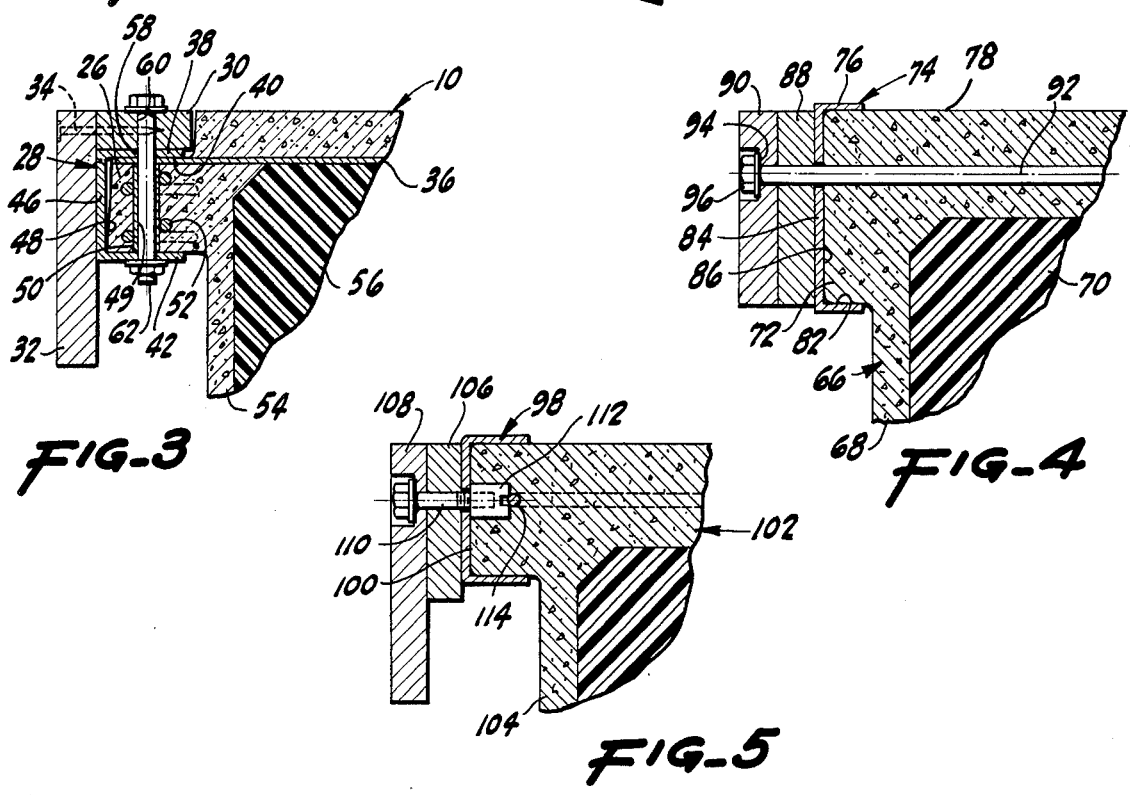

CHANNEL CONNECTOR FOR FLOATING DOCKS

BACKGROUND OF THE INVENTION

This invention comprises an improvement in connecting devices for modular floating dock structures where a rigid, high-strength interconnection of individual float units is required, for example, in moorings where surge and other wave action of long wavelength act to work apart connectors which flex. The connecting devices of this invention relate in part to the spaced connectors devised by this inventor and described in U.S. Pat. No. 3,967,569, issued July 6, 1976, entitled, "Floating Dock," and in part to the attachment connectors used to attach complementary structures such as corner braces to the float units described in patent application Ser. No. 653,624, filed Jan. 29, 1976, entitled, "Apparatus for Connecting Floating Docks."

The spaced connectors in the "Floating Dock" application comprise a pair of spaced stringers which are connected to the top and bottom surfaces of a flange structure which projects from the sides of a float unit. The stringers are secured by bolts inserted through vertical coincident holes in both the stringers and flange structure such that the stringers and flange structure are sandwiched together in compression. While the connection provides a substantially rigid interconnection of the float units there are extreme situations where the improved interconnection means of this invention is useful in maintaining the integrity of the dock system. For example, in areas having long period waves, entire float units may be caused to cantilever from adjacent units placing substantial stresses on the juncture points between floats. In such situations a connector device that has a strength approaching the structural strength of the units themselves is desirable to prevent eventual breakup of the float system.

The use of steel bracket connectors which attach to the top and bottom surfaces of projecting flange structures for attachment of auxiliary components was described in "Apparatus for Connecting Floating Docks" referenced above. This use laid the groundwork for the adaptation of similar bracket type connectors elongated to span portions of adjacent float units to interconnect the float units. Because a vertical side plate is integrally fixed to upper and lower horizontal plates, a high strength structural unit is created. When bolted to the flange structure of adjacent float units a virtually rigid interconnection is formed. In many environments this interconnection constitutes a substantial improvement.

SUMMARY OF THE INVENTION

The channel connector for floating docks described in this invention comprises a device for interconnecting adjacent modular float units to form a floating dock system. The particular channel connector described is preferably designed for use in environments where a heavy-duty interconnection means is required. The channel connector is therefore constructed of a structural steel either as a prefabricated U-channel or a custom constructed U-channel fabricated from three steel plates welded into a channel configuration. The channel connection is designed to attach to a projecting flange along the sides of the float units, such that the horizontal top plate of the channel interfaces the top surface of the flange and the horizontal bottom plate interfaces to bottom surface. Preferably, the channel is attached by a plurality of vertical bolts which pass through the top and bottom plates and the flange structure such that these components are sandwiched together. Alternately, the vertical side plate interconnecting the top and bottom plates is arranged against the peripheral side face of the flange structure and the channel is attached to the flange structure by horizontally arranged bolts anchored in the flange structure and projecting through the vertical plate of the channel.

The channels extend longitudinally between adjacent floats and either run the entire length of the float units or preferably along only a portion of the flange structure of the float units. To provide a suitable buffer for moored boats, the channels are covered by wooden walers which protect the boat hulls from the steel channels.

The channels are simple to fabricate and adapt to existing floating dock designs providing a substantial increase in the structural strength of the interconnection for modular float units.

BRIEF DESCRIPTION OF THE DRAWINGS

FIG. 1 is a schematic view of a floating dock system incorporating channel connectors.

FIG. 2 is an elarged plan view partially fragmented of a portion of the dock system of FIG. 1.

FIG. 3 is a cross sectional view taken on the lines 3—3 in FIG. 2.

FIG. 4 is a cross sectional view of an alternate embodiment of the floating dock system and channel connectors.

FIG. 5 is a cross sectional view of a further alternate embodiment of the floating dock system and channel connectors.

DETAILED DESCRIPTION OF THE PREFERRED EMBODIMENTS

Referring to the schematic view of the floating dock system in FIG. 1, a plurality of modular float units, designated generally by the reference numeral 10, are shown interconnected to form the overall dock system. The modular float units 10 are interconnected in series to form a main walkway 12 and a side finger 14. The side finger 14 is joined to the main walkway 12 by right angle brackets 16a and 16b. One bracket 16b, includes a roller apparatus 18 in a collar arrangement around a concrete piling 20 which in combination with a similar roller apparatus 22 around a second piling 24 at the end of the main walkway, anchors the dock system from drift, but allows a vertical displacement occasioned by changes in the water level by tidal or seasonal occurrences.

The float units 10 shown in FIG. 1 are generally rectangular in cross section and arranged end to end in series. The float units 10 each have a projecting flange structure 26 shown in part in FIG. 1 and in greater detail in FIG. 3. The flange structure 26 comprises a reinforced concrete projection running longitudinally along the side of the float units, preferably adjacent the top surface of the float units as shown. When the float units are aligned in series with ends abutting, the flange structures of adjacent units form a continuous structural projection along the entire length of the float system. It is this projecting structure that is used as the basis for interconnecting the float units into a unitary structure.

The connecting means herein employed to achieve the high strength, virtually rigid interconnection of the float unit comprises a steel U-channel 28, which is applied against a portion of the flange structure 26 of two adjacent float units as shown in FIG. 1. Over the U-channels 28 are elongated wooden stringers 30 which run along the entire length of the float system. Abutment of adjacent stringers in a series is preferably located at the midpoint of the float units. Optionally, a second series of stringers (not shown) may be included on the underside of the flange structure over the U-channel. The stringers and U-channel are fastened together with the flange structure by bolts 62 vertically passing through the stringers, U-channel and flange structure.

For the protection of boat hulls from the abrasive concrete of the flange structure and the steel U-channels, elongated wooden walers 32 are fastened against the flange structure to provide an overlying protective buffer.

Referring now to FIGS. 2 and 3, the arrangement of the U-channel 28 on the flange structure 26 is shown in greater detail. In FIG. 2 portions of two adjacent float units 10 are shown arranged end to end with a top stringer 30 overlying and covering a U-channel 28 shown in dotted line, and the flange structure 26. A side waler 32 is mounted against the flange structure and side edge of the top stringer 30 and fastened to the stringer by spikes 34. For added strength, transverse steel straps 36 embedded in the top of the float units structurally interconnect one side of the float units with the other in the locality of the interconnection area of adjacent float units.

The manner of attaching the U-channels to the flange structure is shown most clearly in FIG. 3. In this Figure, the U-channel 28 is illustrated in cross-section with a horizontally arranged top plate 38 mounted against the top surface 40 of the flange structure 26, and a horizontally arranged bottom plate 42 mounted against the bottom surface of the flange structure. An interconnecting vertically arranged spanning side plate 46 is generally positioned against a side surface 48 of the flange structure. For ease in casting the float units 10 the side surface 48 is shown sloped to facilitate removal of the cast float unit from a mold. The three plates 38, 42 and 46 are previously welded together into a rigid structural member to form the U-channel before installation on the flange structure.

Along the length of the flange structure are a series of vertical through holes 49 (FIG. 2) formed by tubular sleeves 50 which are cast in place during fabrication of the float units. The holes are uniformly spaced along the flange structure to create a modular system of standard interchangeable parts. The tubular sleeves 50 are preferably steel which permits them to be welded to structural reinforcing iron 52 in the concrete shell 54 which encases the polyurethane foam core 56 of the float units. The U-channel includes a series of holes, i.e., 58 which are coincidentally arrangeable with the holes in the flange structure. The top stringer similarly includes a series of holes 60 coincidentally arrangeable with the holes in the channel and flange structure. A bolt and nut fastener 62 inserted through the holes fastens the three members together in sandwich fashion.

While the U-channel may run the entire length of the flange structures, it is unnecessarily expensive and it is therefore preferred that the U-channel be uniformly arranged on a portion of the flange structures of two adjacent float units such that two holes on each flange structure are utilized as shown in FIG. 2. The buffer waler 32 is mounted against the stringer 30 and U-channel and fastened by spikes as shown in FIG. 3.

While the embodiment shown in FIGS. 1, 2 and 3 comprises the preferred embodiment, other embodiments utilize the U-channel in combination with a float structure to advantage. For example, referring to FIG. 4, a cross-sectional view of a portion of a float structure equivalent to the portion in FIG. 3 is shown. The float unit 66 is constructed with a concrete outer shell 68 encasing a polyurathane core 70. The float unit 66 has a projecting integral flange structure 72 adjacent the top surface of the unit. A prefabricated structural steel U-channel 74 is mounted against the flange structure of the float unit. The flange structure is designed to fit the "U" portion of the U-channel, which in this embodiment is a standard structural member, such that the top rail 76 of the channel is oriented against the top surface 78 of the flange structure; the bottom rail is oriented against the bottom surface 82 of the flange structure; and the span segment 84 of the channel is oriented against the side face 86 of flange structure. The channel 74 is mounted against a portion of the flange structures of two adjacent float units as described for the preferred embodiment. Two wide elongated buffer stringers 88 and 90 are positioned against the span segment 84 of the channel and fastened together with the channel to the flange structure by horizontally arranged long bolts 92 (one shown) which pass through holes in the stringers, channels and floating units and span the entire width of the float units interconnecting the stringers and channels on opposite sides of the float units. The long bolts 92 include washers 94 and nuts 96 at their threaded ends which are countersunk in the outer stringer 90 to avoid damage to boat hulls from projecting bolts.

A further embodiment shown in FIG. 5 illustrates a U-channel 98 formed from a deformed plate bent into a "U" configuration to fit on a projecting flange 100 of a float unit 102 again constructed with a concrete outer shell 104 and a polyurethane core. The U-channel is mounted to the projecting flange structure 100 in a manner similar to that described with reference to FIG. 4. Two outer stringers 106 and 108 are mounted against the U-channel and the stringers and channel are fastened to the flange structure by a bolt 110 which threadably engages an insert 112 precast into the flange structure and anchored to structural reinforcing rods 114 in the shell 102 of the float unit. The bolt 110 ties the stringers and U-channel firmly against the flange structure. The bolt is countersunk in the outer stringer 108 again for the protection of the hulls of boats moored or landing at the dock system.

In each embodiment, the recognized structural strength of the U-channel resists any bending at the interconnection between adjacent float units.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. In a float structure formed of a plurality of adjacently arranged interconnected float units, each float unit comprising an enclosed, substantially rectangular shell structure with opposed sides with sidewalls and ends with end walls, a top and a bottom, an improved means of interconnecting said float units, comprising; flange structures on said float units comprising a portion of said sidewalls horizontally projecting from said sidewalls and extending the length of said sidewalls, said flange structures having a horizontal top mounting surface a side and a horizontal bottom mounting surface spaced from said top surface; connection members for connecting at least two of said float units together with ends abutting, said connection members each comprising an elongated fabricated steel U-channel having an upper plate element mounted against said top mounting surface of said flange structures and a lower plate element mounted against said bottom mounting surface of said flange structures, and a spanning plate integrally connecting said upper and lower plates arranged at each side of said flange structures; said U-channel extending longitudinally along at least a portion of the flange structures of at least two adjacent float units; and fastening means extending through said U-channels and engaging said flange structures for securing said U-channels to at least said portions of said flange structures of said float units.

2. The apparatus of claim 1 wherein said fastening means includes a structural element extending through said upper plate element said flange structure and said lower plate element.

3. The apparatus of claim 2 wherein said fastening means includes tubular elements each being embedded in said flange structure extending between said top mounting surface and said bottom mounting surface through which said structural element extends.

4. The apparatus of claim 3 wherein said improved means of interconnecting said float units comprises further at least one elongated stringer mounted on said top mounting surface of said flange structures overlying said upper plate element of said U-channel, said fastening means extending through said stringer fastening said stringer to said flange structure.

5. The apparatus of claim 4 wherein said improved means of interconnecting said float units comprises further an elongated waler mounted against said side of said flange structure overlying said spanning plate of said U-channel, said waler being fastened to said stringer.

6. The apparatus of claim 1 wherein said fastening means includes a structural element extending through said spanning plate of said U-channel.

7. The apparatus of claim 6 wherein said fastening means includes an anchor insert embedded in said flange structure into which said structural element is engageable.

8. The apparatus of claim 7 wherein said improved means of interconnecting said float units comprises further at least one elongated waler mounted against said side of said flange structure overlying said spanning plate of said U-channel said waler being fastened to said flange structure by said structural element, said structural element extending at least in part through said waler.

9. The apparatus of claim 6 where said flange structures and U-channels are constructed and arranged on both opposite sides of said float units and said fastening means includes a structural element extending through said spanning element of said U-channels and said flange structures on both sides of said float units.

10. The apparatus of claim 9 wherein said improved means of interconnecting said float units comprises further at least one elongated waler mounted against said side of said flange structure overlying said spanning plate of said U-channels on both sides of said float units, said walers being fastened to said flange structure by said structural element extending at least in part through said walers.

* * * * *